3,056,846
METHOD AND APPARATUS FOR HEAT CONDITIONING AND FEEDING HEAT-SOFTENABLE MATERIALS

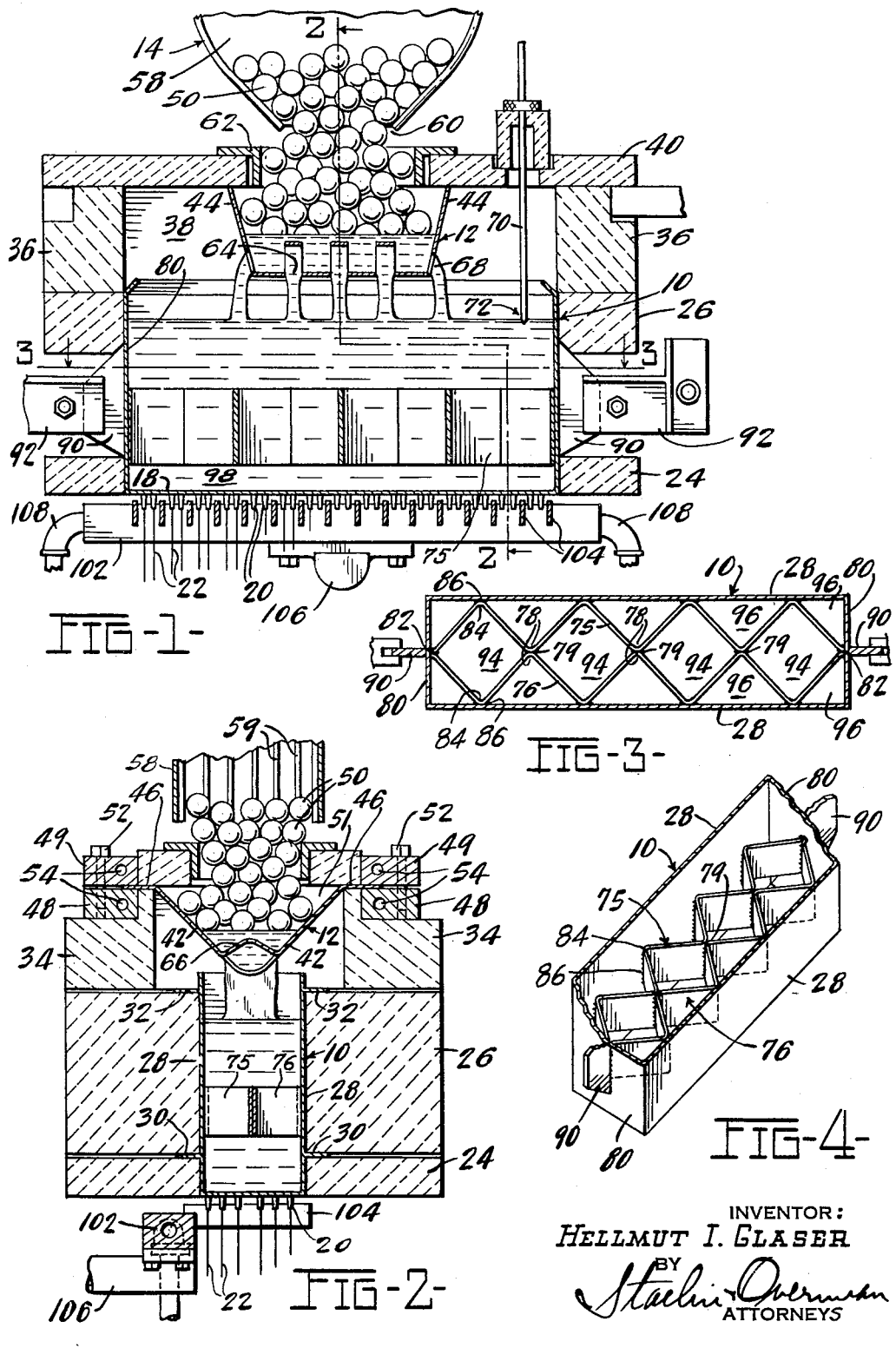

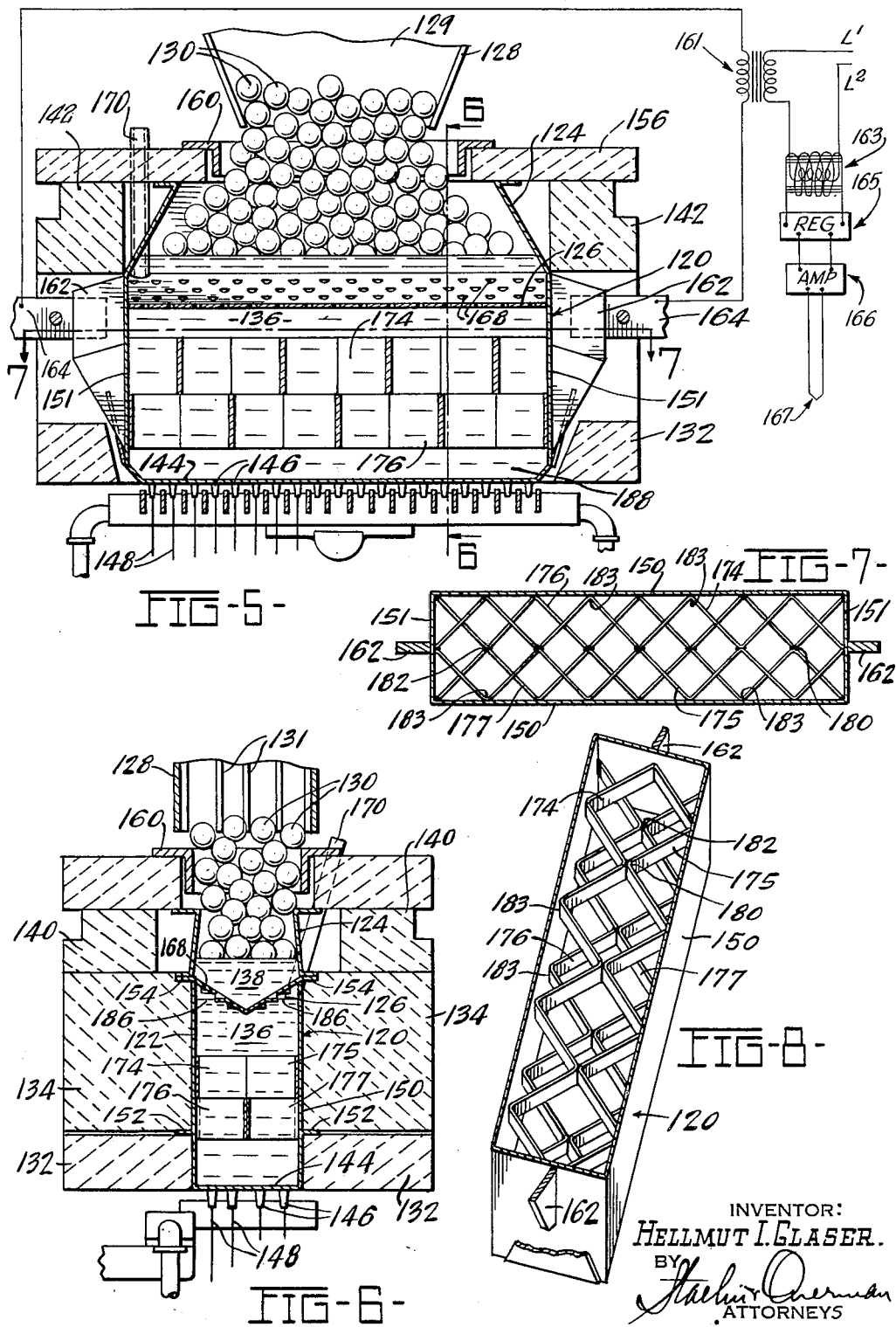

Hellmut I. Glaser, Anderson, S.C., assignor to Owens-Corning Fiberglas Corporation, a corporation of Delaware
Filed Aug. 13, 1958, Ser. No. 754,839
13 Claims. (Cl. 13—6)

This invention relates to a method of and apparatus for heating and heat conditioning mineral materials, such as glass, which may be softened by heat and for delivering or feeding streams of the heat-softened material and, more particularly, to an arrangement for supplying heat to the material already in a molten condition for flowing streams of the material through a plurality of orifices whereby the streams may be attenuated to linear bodies, filaments, or fibers especially usable in forming strands, yarns or threads for textiles.

In the manufacture of textiles formed of strands, yarns or threads of continuous glass filaments, the filaments must be of substantially the same size and character in order to produce commerically acceptable textiles. The glass or other heat-softenable mineral material employed in forming filaments for textile uses must be highly refined and of a homogeneous character.

In order to secure high quality glass suitable for such purposes, the glass batch composed of several constituents or ingredients, is melted in a comparatively large furnace and the molten glass fined and refined until it is substantially free of seeds, cords, stria and impurities which would impair the quality of the glass. The refined glass from the melting furnace is fashioned or molded into bodies preferably of spherical shape resembling marbles, which are subsequently resoftened and processed to form textile fibers or filaments.

Heretofore, various methods have been employed for remelting the marbles and flowing streams of the remelted glass from a feeder for attenuation to filaments. For example, in one method the mables are delivered at required intervals directly into a receptacle or feeder which is electrically heated by flowing electric current through the walls of the feeder to reduce the glass of the marbles to a molten or flowable state and streams flowed from oirfices in the floor of the remelting receptacle.

Another method involves the step of preheating the marbles adjacent a feeder and delivering the premelted glass into a feeder, the walls of which are heated by electrical energy to maintain the glass in a molten or flowable condition.

In such prior arrangements wherein the walls and floor of the feeder conduct the current and heat is generated by the resistance of the walls and floor to the passage of current, the glass adjacent to or in contact with the walls and floor is of a higher temperature than the molten glass at the central regions of the feeder.

Thus, there are varying temperatures within the feeder which cause convection movements of the glass in the various regions of the feeder so that the glass is not of uniform temperature and viscosity throughout the feeder. This condition results in a variation in the size of streams flowing through the feeder orifices. Glass composition includes several kinds of glasses or ingredients and the convection movements of the glass caused by temperature variations tends to separate or stratify the ingredients and impair the homogeneous character of the glass in the feeder and streams delivered from the feeder are not of uniform composition.

The present invention embraces a method of compartmentalizing the interior of a feeder by a current conducting medium whereby a more uniform temperature and viscosity of the molten material or glass is attained throughout all regions of the feeder.

An object of the invention is the provision of a method of impeding or minimizing convection currents in the molten glass whereby to maintain the glass homogeneous throughout the interior of the feeder.

Another object of the invention is the provision of a method wherein electric current is conducted through the interior region of a feeder in a tortuous or undulating path whereby the heat generated by current flow is substantially uniformly distributed in the glass in the feeder.

Another object of the invention is the provision of a method of conducting electric current through a feeder containing molten glass or similar heat-softenable material in a plurality of paths whereby accurate control of the temperature and viscosity may be maintained and streams flowing through orifices in the feeder are of substantially uniform size.

Another object of the invention is the provision of an apparatus adapted to contain molten glass or the like from which are delivered streams of glass, the arrangement including current conducting partitions or strips compartmentalizing the interior of the feeder for minimizing convection or lateral flow of glass interiorly of the feeder to maintain a high degree of homogeneity of the material in the feeder.

Another object of the invention is the provision of a feeder construction adapted to contain molten glass or other molten filament forming material embodying metallic strips or members of nonrectilinear or undulated shape of a size that the resistance to flow of electric current provides the proper amount of heat for maintaining all interior regions or zones of glass in the feeder at substantially the same temperature and viscosity.

Another object of the invention is the provision of a feeder or bushing for molten glass or the like embodying heat stabilizing compartments disposed above the floor of the feeder which is provided with orifices whereby the glass in all regions of the feeder flows downwardly toward the region of discharge of the glass with a minimum of convection or transverse flow of the glass in the feeder and thereby promote uniformity of streams of glass for attenuation to filaments of uniform diameter.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a vertical sectional view of a form of material melting and feeding apparatus embodying the invention;

FIGURE 2 is a vertical sectional view taken substantially on the line 2—2 of FIGURE 1;

FIGURE 3 is a horizontal view taken substantially on the line 3—3 of FIGURE 1;

FIGURE 4 is a fragmentary isometric view of a feeder chamber embodying a combined heating and compartment forming means of the invention;

FIGURE 5 is a view similar to FIGURE 1 showing another modified type of material melting and feeding apparatus embodying another form of the invention;

FIGURE 6 is a vertical sectional view taken substantially on the line 6—6 of FIGURE 5;

FIGURE 7 is a horizontal sectional view taken substantially on the line 7—7 of FIGURE 5, and FIGURE 8 is an isometric view of the arrangement illustrated in FIGURE 7.

While the method and apparatus of the invention have particular utility in processing and conditioning glass for forming textile filaments, it is to be understood that the method and apparatus of the invention may be utilized for processing and conditioning other heat-softenable mineral materials or wherever uniform heating of a body of heat-softenable material is desired.

Referring to the drawings in detail and initially to FIGURES 1 through 4, there is illustrated an apparatus embodying the invention particularly usable for processing and conditioning heat-softened glass from which streams of glass are attenuated to fine filaments or fibers especially suited for manufacturing textiles. The apparatus illustrated in FIGURES 1 and 2 is mounted upon a suitable frame (not shown) adapted to support a feeder or bushing 10, a material softening or melting receptacle 12 and a hopper means 14, the latter adapted to contain a supply of pieces or bodies of heat-softenable material such as glass to be processed.

The feeder or bushing 10 is adapted to receive heat-softened glass from the melting receptacle 12 and is of rectangular configuration formed of platinum rhodium or other material capable of withstanding high temperatures. The bottom wall or floor 18 of feeder 10 is formed with a plurality of tips or projections 20 provided with small orifices or openings through which the glass is discharged in a plurality of streams 22. The streams 22 are adapted to be attenuated to continuous filaments by suitable attenuating means as by winding the filaments upon a drum or sleeve (not shown) to form a package. The filaments of the package may be subsequently utilized in weaving or manufacturing textiles.

The lower portion of the feeder or receptacle 10 is surrounded by refractory 24 upon which is superimposed blocks of refractory 26. The side walls 28 of the feeder 10 are provided with laterally extending flanges 30 engaging the refractory 24 and the flanges 32 engaging the upper surfaces of the blocks of refractory 26 to support the feeder. The refractory is highly temperature resistant and serves to minimize heat loss from the feeder 10.

Means is provided adjacent and above the feeder 10 for heating or reducing the mineral material such as glass to a softened or molten condition whereby the softened material flows into the feeder or bushing 10 at a temperature approaching that of the material in the feeder in order to substantially eliminate or minimize thermal shock to the material in the feeder. Mounted upon the blocks of refractory 26 is a pair of blocks or members 34 extending lengthwise of the feeder 10 and a second pair of blocks 36 of refractory extending transversely and forming with the longitudinally extending blocks 34, a substantially rectangular chamber or space 38.

The blocks 34 and 36 support a plate 40 of refractory which provides a seal or closure for the chamber 28. Disposed within the chamber 38 is the member or receptacle 12 in which the material is reduced to flowable or molten condition. The member 12 is formed of platinum, rhodium or other material capable of withstanding high temperatures. As shown in FIGURE 2, the member 12 is of generally triangular cross-section and is provided with converging side walls 42 and canted end walls 44.

The side walls 42 are provided with planar extensions 46 which are engaged by metal conductors or bus bars 48 and 49 adapted to conduct electrical energy from a supply to the receptacle 12, the resistance to the passage of electric current through the receptacle walls producing heat to reduce the solid pieces or bodies 50 of glass to a flowable or molten condition in the melting zone or chamber 51 provided by the receptacle 12. The bus bars 48 and 49 are clamped to the extensions 46 by bolts 52. The bus bars 48 and 49 are provided with passages 54 accommodating cooling water to maintain the bus bars at safe operating temperatures.

The hopper 14 is adapted to contain a supply of pieces of material, preferably in the form of spherically shaped bodies or marbles 50. The marbles 50 are molded of highly refined glass suitable for use in forming textile filaments. The hopper 14 is formed with imperforate side walls 58 and end regions of parallel bars 59 spaced so as to prevent discharge of the marbles between adjacent bars, the side walls 58 and bars 56 terminating to form a passage 60 through which the marbles 50 are fed into the melting receptacle 12.

The bottom region of the melting receptacle 12 is formed with passages 64 through which the heat-softened glass flows into the feeder 10. The passages 64 are formed in the apex region of the receptacle by slitting the material of the side walls 42 and bending the metal between adjacent slits upwardly to form the bridge-like strips 66. Each of the end walls 44 is also provided with a passage 68 through which material may flow from the melting receptacle 12.

By regulating the electric current flow through the walls of the receptacle 12 and strips 66, the rate of melting the glass marbles or cullet 50 may be varied.

A circuit (not shown) for supplying current to the bus bars 48 and 49 is inclusive of means for controlling the amount of molten glass in the feeder 10. The control means includes a probe bar 70 intercalated in a control circuit and adapted to regulate the amount of electrical energy flowing through the walls of the melting receptacle 12. The probe bar 70 has a tapered extremity 72 normally extending a short distance into the molten glass in the feeder 10.

When the depth of glass in the feeder 10 varies, there is a corresponding variation in the area of the probe bar in contact with the molten glass which sets up a difference in potential between the probe bar and the molten glass which is utilized to regulate current flow through the melting receptacle 12. Thus when the height of the glass in the feeder 10 rises, the current flow through the receptacle 12 is proportionately decreased and the heating of the glass marbles in the receptacle 12 is correspondingly decreased to reduce the rate of flow of molten glass into the feeder. As the glass depth in the feeder is lowered, the control through the probe bar 70 increases current flow through the melting receptacle 12 to accelerate the rate of melting of the marbles and increase the rate of flow of glass into the feeder.

Heretofore a current passed through the walls of a feeder has been utilized to maintain the glass in the feeder in a flowable state, the resistance of the metal of the walls establishing heat which is transferred to the glass by contact of the glass with the feeder walls. This type of heating has been unsatisfactory for several reasons. The glass in direct contact with the feeder walls is heated to a higher temperature than the glass remote from the walls.

A glass composition suitable for forming fine glass filaments for textile uses comprises several ingredients, and unequal heating of the glass tends toward a separation of the ingredients and not only impairs the homogeneity of the glass but the temperature differentials in the feeder result in differences in viscosity of the glass in the various regions of the feeder. The variations in viscosity result in streams of varying sizes discharged through the orifices in the bottom wall and filaments attenuated therefrom are not of uniform size.

The present invention embodies an arrangement for stabilizing the heat pattern or heat distribution throughout the glass in the feeder and such means is configurated to compartmentalize the interior region of the feeder to maintain or preserve the glass composition in homogeneous condition. Disposed within the feeder 10 is a pair of strips or members designated respectively 75 and 76, which extend lengthwise of the feeder in the manner particularly illustrated in FIGURES 3 and 4.

Each of the strips 75 and 76 is of nonrectilinear shape, being illustrated as of zigzag or undulating configuration. The strips 75 and 76 are preferably arranged within the feeder as shown in FIGURES 3 and 4 with adjacent apices 78 thereof in juxtaposed relation and welded together as at 79. The adjacent ends of the strips converge at the central region of each end wall 80 of the feeder and are welded together and to the wall as illustrated at 82. The alternate spaced apices 84 formed in the strips 75 and 76 are welded as at 86 to the inner surface of the side walls 88 of the feeder 10.

Through this means the strips are supported in a fixed position within the feeder. The strips 75 and 76 are formed of platinum rhodium or other suitable alloy to withstand the intense heat of the molten glass within the feeder. Secured to the end walls 80 of the feeder 10 and extending therefrom are terminals or connecting lugs 90 to which are secured current conducting members or clamps 92 which are connected with a current supply for feeding electric current to the feeder and through the strips 75 and 76.

The assembly of strips 75 and 76 within the feeder resembles a honeycomb shape as shown in FIGURE 4, each strip providing a nonrectilinear metallic path for the flow of current generally lengthwise through the feeder from one end wall to the other end wall so that the current flow through the strips establishes heat which is substantially uniformly distributed through the glass in the feeder at the region of the strips 75 and 76.

The strips together form substantially square compartments 94 and triangularly-shaped compartments 96. These compartments provide a means for impeding or restricting lateral flow of the molten glass in the feeder and hence prevent or substantially reduce the tendency for the ingredients of the glass to separate and thus maintain a homogeneous composition. By providing for a uniform distribution of heat throughout the feeder, the viscosity of the glass throughout all regions of the feeder is substantially uniform so that the streams 25 discharged through the orifices in the tips 20 are of substantially uniform size.

As shown in FIGURE 1, the compartmentalizing strips 75 and 76 are preferably spaced above the floor 18 of the feeder providing a region 98 adjacent the feeder floor to provide an unimpeded supply of heat-softened glass at the proper viscosity over the entire floor area of the feeder. The current flows through the undulating or nonrectilinear paths provided by the strips 75 and 76 throughout the length of the feeder and current flows through the side walls 88 and hence the regions of the glass adjacent the side walls 88 and the strips 75 and 76 are substantially uniformly heated so that there are no zones within the feeder wherein substantial temperature variations exist.

The compartments established through the pattern or arrangement of strips 75 and 76 with each other and with the side and end walls of the feeder substantially eliminate or reduce convection currents in the glass so that there is an effective stabilization of heat in the glass in the several compartments.

Where the streams 22 are to be attenuated to continuous filaments, it is desirable to maintain the glass within the feeder 10 at a viscosity slightly lower than that of the streams from which the filaments are formed. Hence it is desirable to slightly increase the viscosity of the material of the streams by employing a temperature controlling means just beneath the feeder 10.

As shown in FIGURES 1 and 2, a tubular member 102 extends substantially parallel with the feeder 10 and is equipped with a plurality of transversely extending, longitudinally spaced metal fins 104, a fin preferably being disposed between each of two groups of transversely aligned orifice members 20. The tubular member 102 is mounted upon a suitable supporting bar 106 and is connected at its ends with inlet and outlet pipes 106 and 108 for conveying cooling fluid such as water through the member 102.

Some of the heat from the streams of glass is transferred from the streams through the fins 104 to the member 102 and to the circulating liquid moving through the tube 102. Through this arrangement an accurate control of the viscosity of the streams 22 may be attained.

FIGURES 5 and 6 illustrate another form of apparatus for melting or softening glass or other mineral material and feeding streams of the glass, this apparatus embodying a modified form of feeder compartmentalizing and heating means particularly illustrated in FIGURES 7 and 8. The apparatus shown in FIGURES 5 and 6 is mounted upon a suitable frame (not shown) adapted to support a combined glass melting and stream feeding means 120 embodying an arrangement for coordinating the rate of heat-softening or melting of the glass with the rate of flow or delivery of streams thereof from the feeder.

The feeder receptacle portion 122 is separated from a melting receptacle portion 124 by a combined heating and glass flow control member 126. The frame (not shown) supports a hopper 128 adapted to contain a supply of marbles or bodies 130 of glass. The frame supports a rectangular plate 132 formed of refractory, the plate supporting blocks 134 disposed at each side of the feeder receptacle 122. The feeder and melting receptacles are formed of high temperature resistant metal or alloy such as platinum rhodium. The member or plate 126 extends lengthwise of the feeder portion 122 and is of V-shaped cross-section as shown in FIGURE 6. The member 126 separates the feeder zone or chamber 136 from the melting zone or chamber 138. Mounted upon the blocks 134 are blocks 140 formed of refractory and disposed at each side of the melting receptacle 124. Also supported by the blocks 134 are blocks or members 142 formed of refractory and extending transversely of the melting receptacle 124.

The floor or lower wall 144 of the feeder portion 122 is fashioned with a plurality of downwardly extending projections or tips 146, the tips being formed with orifices through which the molten glass in the feeder region is discharged in a plurality of streams 148. The blocks 132—134, 140 and 142 provide a medium or means for effectively retarding or preventing heat loss from the glass in the feeder and melting zones. The side walls 150 of the feeder portion 122 are provided with flanges 152 and 154 which engage the surrounding refractory to support the melting and feeder construction.

A cover plate or member 156 accommodates a member 160 defining a passage to facilitate movement of the glass marbles 130 from the hopper 128 into the melting receptacle 124. The hopper illustrated at 128 is of the same construction as shown in FIGURE 1.

The end walls 151 of the feeder portion of the unit 120 are provided respectively with current conducting lugs or members 162 to which current supply bus bars or conductors 164 are connected by suitable clamping means. The electric current is of comparatively high amperage for supplying heat to the feeder portion and the melting portion, the heat being generated by the resistance to the passage of current through the walls of the feeder receptacle and the melting receptacle and the heater strip or plate 126.

The heater strip 126 forming the partition between the feeder zone and the melting zone is formed with openings to provide for flow of glass into the feeder and establish automatic control or regulation of the glass level or hydrostatic head of molten glass in the feeder zone 136 without the use of level control devices or mechanical marble gating or metering devices.

The central apex region of the partition heater strip 126 is disposed so as to be immersed in the molten glass in the feeder zone 136. The partition 126 is fashioned with rows of passages or openings 168 formed by shearing the metal and bending or distorting the sheared portions away from the planar surfaces of the V-shaped partition forming a louver-like configuration.

The metal portions bent to form the passages 168 facilitate current flow lengthwise of the partition 126 to minimize obstruction to current flow. Venting means in the form of one or more tubes or pipes 170 are provided, extending below the partition 126 through the cover plate 156 to facilitate the escape of volatiles or gases from the molten glass in the feeder chamber, one of the tubes being illustrated in FIGURES 5 and 6.

The arrangement shown in FIGURES 5 and 6 includes a modified form of means for compartmentalizing or partitioning the interior region of the feeder portion 136 whereby heat is more uniformly distributed through the glass or other material in the feeder and convection movements of the glass substantially minimized to maintain the homogeneous character of the glass in the feeder. The heating and compartmentalizing means is particularly shown in FIGURES 7 and 8 and includes two sets of pairs of strips arranged lengthwise of the feeder, the strips 174 and 175 of one set being arranged above the second pair of strips 176 and 177 as illustrated.

The ends of the strips are welded to the end walls 151 of the feeder construction. The strips 174 through 177 are of zigzag or undulating shape and form metallic paths for current flow in nonrectilinear or undulating paths through the glass or other material in the feeder. The upper set of strips 174 and 175 are welded together as at 180 at the junctures of the apices of the undulations, and the adjacent apices of the undulations of the strips 176 and 177 are welded together as at 182. The apices of the strips contacting the side walls of the feeder portion are welded thereto at 183.

As particularly shown in FIGURES 7 and 8, the undulations or zigzag configurations of one set of strips are offset or staggered lengthwise of the undulations of the second set of strips to provide for effective distribution of current flow by way of metallic paths through the feeder and hence attain a more uniform distribution of heat or stabilized heat pattern in the glass in the feeder. In this arrangement, the compartments or partitioned regions formed by the upper set of strips are offset or staggered with respect to the compartments or partitioned regions formed by the lower set of strips whereby a substantial number of compartments or compartmented regions are provided.

Thus current flow is established between the terminals or current connector lugs 162 through all of the strips 174 through 177 in nonrectilinear or undulating paths through the glass in the feeder whereby the glass in the feeder is maintained at a substantially uniform temperature throughout all of the regions thereof. The compartmentalization arrangement providing substantially uniform heating of the glass reduces or eliminates temperature variations and thus substantially eliminates any tendency for the ingredients or constituents of the glass composition to separate whereby the homogeneity of the glass is maintained by obstructing or preventing circulatory convection movements of the glass in the feeder portion.

It should be noted that the lowermost set of strips 176 and 177 is elevated a short distance above the floor 144 of the feeder providing a space 188 to facilitate unobstructed movement or flow of glass in the feeder to all of the orifices formed in the tips 146.

Through this arrangement the glass throughout all regions of the feeder section 122 is maintained at a substantially constant temperature and hence a substantially constant viscosity promoting the formation of glass streams of uniform size.

By varying the current flow through the strips and wall regions of the feeder, the temperature and hence viscosity of the glass may be varied and controlled, this facter being utilized to control the size of the streams flowing through the orifices in the tips 146 and hence the fineness or size of the filaments attenuated from the streams. The current control circuit for the feeder section 122 is of the character shown in Willis Patent 3,012,373 and includes a transformer 161 and a saturable reactor 163 connected with a current supply L1, L2, the reactor being connected with an adjustable regulator 165 which supplies direct current to the reactor through an amplifier 166 from a thermocouple 167, the thermocouple being positioned to be influenced by temperature variations in the feeder section.

In the operation of the arrangement shown in FIGURES 5 and 6, a current of low voltage and high amperage flows between the lugs or terminals 162 through the walls of the feeder portion and melting portion, the bottom wall 144, the melting control partition strip 146 and the compartmentalizing heater strips 174 through 177. The shape of the lugs or terminals 162 is such that by changing the region of contact of the connectors or bus bars 164 with the terminal lugs 162 in a vertical direction, a measure of control of the division of current flow through these components may be attained.

The solid marbles of glass contained in the hopper 128 move downwardly by gravity at a rate at which they are melted in the melting zone 138 by the heat generated through current flow through the partition strip 126 and the adjacent wall regions of the melting receptacle 124. The level of the glass in the feeder zone 136 indicated at 186 shown in FIGURE 6 is automatically maintained substantially constant by reason of the change of direction of the heat transferred from the partition strip 126 to the molten glass above and below the heater strip 126.

In the surface areas of the partition strip 126 in direct contact with the molten glass, heat transfer is effected by conduction and, to a lesser extent, by radiation from the surface of the strip. In surface regions of the strip 126 which are not in direct contact with the molten glass, heat transfer is effected only by radiation which is much less effective than by conduction. The normal or predetermined level of the glass indicated at 186 in the feeder region 136 is established and maintained as follows: As streams of glass are withdrawn from the orifices in the tips 146, the level 186 of the molten glass in the feeder chamber 136 is lowered.

When this occurs, there is less area of the lower surface of the strip 126 in actual contact with molten glass in the feeder chamber and hence a lesser amount of heat is transferred to the glass below the partition by conduction. This action automatically diverts more of the heat generated by current flow through the strip 126 to the glass above the strip and the melting rate of the marbles increased. Furthermore the molten glass above the strip 126 is elevtaed in temperature, and its viscosity proportionately decreased. Through this shift or change in the direction of heat transfer from the strip 126, the glass adjacent and above the strip 126 becomes more fluid and glass flow through the orifices 168 in the strip into the feeder chamber 136 is increased, thus raising the level of the glass in the feeder chamber.

As the glass level in the feeder rises, more area of the lower surface of the strip 126 is contacted by the molten glass below the strip, causing more heat to be transferred by conduction to the glass below the strip with a lesser amount of heat transferred to the glass above the strip. Thus, by automatically restricting or decreasing the heat flow from the strip 126 to the glass above the strip, the viscosity of the glass is raised and the melting rate reduced.

The more viscous glass does not readily flow through the orifices so that the level of the glass in the feeder chamber 136 does not rise appreciably above its standard level. If withdrawal of the glass from the orifices in the tips 146 reduces the level of glass in the feeder chamber, the cycle of changes in direction of heat transfer into the glass is repeated whereby a substantially constant level of glass in the feeder section or chamber is maintained through the attainment of a balance of heat distribution to the glass above and below the strip 126.

The heater strip or partition 126 is preferably of V-shaped cross-section so that the apex region thereof extends below the level of the glass in the feeder zone as shown in FIGURE 6, and the angularity of the planar portions forming the V-shape is such that the apex region is immersed even though there are minor deviations in the predetermined level of glass in the feeder, which deviations occur as above described in the automatic maintenance of a substantially constant level by a shift in the direction of transfer of heat from the strip to the glass above and below the strip.

It is to be understood that the forms of heating and compartmentalizing means for the stream feeder or bushing constructions may be used with either of the forms of apparatus shown in FIGURES 1 and 5 or with other types of bushings for feeding streams of glass or other heat-softened material.

The honeycomb-like pattern of the compartmentalizing and heating strips in both forms illustrated herein form a simple yet effective means for compartmentalizing a feeder. The structure is mechanically strong as the apices of the strips adjacent the side walls of the bushing or feeder are welded thereto whereby the strips are amply supported throughout their lengths by the several welds.

The current conducting and compartmentalizing strips in the forms of the invention disclosed are fashioned of a width and thickness to accommodate the amount of current that will heat the strips to substantially the same temperature as that of the feeder walls so as to establish uniform temperature throughout all of the compartmented regions in the feeder. While the strips as illustrated are of nonrectilinear shape of generally undulated or zigzag configuration with substantially planar portions joining the apices of the zigzag or undulated pattern, the strips may be fashioned with curved undulations with the successive convex portions of each strip welded respectively to the feeder side wall and the other mating strip.

The arrangements of the invention effectively stabilize the heat pattern or heat distribution without impeding the vertical downward flow or movement of the heat-softened glass or other material toward the orifices in the floor of the feeder. The space between the floor of the feeder chamber or portion and the edge of the adjacent compartmentalizing and heater strip is sufficient to facilitate lateral flow of the glass or other material adjacent the floor of the feeder and may be preferably of a dimension from 1/8" to 1/2".

It is apparent that, within the scope of the invention, modifications and different arrangements may be made other than is herein disclosed, and the present disclosure is illustrative merely, the invention comprehending all variations thereof.

I claim:

1. The method of conditioning heat-softenable mineral material including delivering molten mineral material into a walled chamber, passing electric current in a plurality of nonrectilinear paths through the material in the chamber for heating the material, confining the material against substantial lateral flow in the regions of passage of current through the material, regulating the electric current passing through the material, and flowing the heated material through orifices in a wall of the chamber.

2. The method of conditioning heat-softenable mineral material including feeding mineral material into a walled chamber, flowing electric current in an undulating path through the material in the chamber, regulating the electric current passing through the material, restricting lateral movement of the material in the chamber at the region of current flow through the material, and flowing streams of the material through orifices in a wall of the chamber at a zone spaced from the region of current flow through the material.

3. A method of processing and conditioning heat-softenable mineral material including establishing a supply of bodies of heat-softenable mineral material, feeding bodies of the material from the supply to a melting zone, melting the material in said zone, flowing the molten material into a walled chamber, flowing electric current through the material in the chamber in undulating paths to heat the material in the region of current flow, regulating the electric current flow through the material in the chamber, restricting lateral flow of the material in the chamber at the region of current flow through the material, and flowing streams of the heated material through orifices in a wall of the chamber.

4. Apparatus for conditioning heat-softenable mineral material, in combination, an elongated walled chamber having orifices formed in a wall thereof through which the material in molten condition is delivered in streams, current conducting means in said chamber for heating the molten material in the chamber, said current conducting means including a metal strip of substantial width and of nonrectilinear shape extending lengthwise of the chamber and having its ends connected with end walls of the chamber, said strip being disposed with its width in a vertical direction and adapted to conduct current in a nonrectilinear path through the material, said strip being positioned out of contact with the bottom wall of the chamber and having spaced intermediate regions secured to a side wall of the chamber.

5. Apparatus for conditioning heat-softenable mineral material, in combination, a walled chamber having orifices formed in a bottom wall thereof through which streams of the material flow from the chamber, current conducting means in said chamber for heating the material in the chamber including a comparatively thin metal strip of nonrectilinear shape, said strip being of substantial width and disposed with its width in a vertical direction and forming with the walls of the chamber a plurality of compartments, said strip adapted to conduct current in a nonrectilinear path through the material, said strip being positioned out of contact with the bottom wall of the chamber and having spaced intermediate regions secured to a side wall of the chamber.

6. Apparatus for conditioning heat-softenable mineral material, in combination, an elongated chamber having orifices in a bottom wall thereof through which the material is delivered in a plurality of streams, current conducting means in said chamber including a plurality of comparatively thin strips of metal extending generally lengthwise of the chamber, said strips being of nonrectilinear shape and having their respective ends connected with the end walls of the chamber and adapted to conduct current in nonrectilinear paths through the material, said strips being of a width substantially greater than their thickness and arranged with their widths in a direction vertically in the feeder to form a plurality of compartments at the regions of current flow through the material.

7. Apparatus for conditioning heat-softenable mineral material, in combination, an elongated chamber having orifices in a bottom wall thereof through which the material is delivered in a plurality of streams, current conducting means in said chamber including a plurality of comparatively thin strips of metal extending generally lengthwise of the chamber, said strips being of undulating shape and having their respective ends connected with the end walls of the chamber and intermediate spaced regions secured to the side walls of the chamber and adapted to conduct current in undulating paths through the material, said strips being of a width substantially greater than their thickness and arranged with their width in a direction vertically in the feeder to form a plurality of compartments at the regions of current flow through the material, said members being positioned out of contact with the bottom wall of the chamber.

8. Apparatus for conditioning heat-softenable mineral material, in combination, an elongated feeder having orifices formed in a bottom wall thereof through which material is delivered from the feeder in a plurality of streams, a plurality of comparatively thin metal strips disposed lengthwise in said feeder adapted to conduct electric current for applying heat to the material in the feeder, said strips being of substantial width and of zigzag shape arranged with their widths in a direction vertically in the feeder and with adjacent apices of the respective strips secured together and the apices of said strips adjacent opposed walls of the feeder being secured thereto, the ends of the strips being secured to the ends of the feeder.

9. Apparatus for conditioning heat-softenable mineral material, in combination, an enlonged horizontally-disposed feeder having orifices formed in a bottom wall thereof through which material is delivered from the feeder in a plurality of streams, a plurality of comparatively thin metal strips disposed lengthwise in said feeder having their ends secured to the end walls of the feeder and adapted to conduct electric current for applying heat to the material in the feeder, the strips being of zigzag shape with adjacent apices of the respective strips secured together and the apices of said strips adjacent opposed walls of the feeder being secured thereto, said strips being of a width substantially greater than their thickness and arranged with their widths in a direction vertically in the feeder to form a plurality of compartments in the feeder, said strips being spaced from the bottom wall of the feeder.

10. Apparatus for conditioning heat-softenable mineral material, in combination, a feeder having orifices formed in a bottom wall thereof through which the material is delivered from the feeder in a plurality of streams, current conducting means disposed in said feeder and extending generally lengthwise thereof, said current conducting means including a pair of comparatively thin metal strips extending generally lengthwise of the feeder with the respective ends of the strips secured to the end walls of the feeder, said strips being of substantial width and disposed with their widths in a direction vertically of the feeder, each of said strips being of undulated shape with the adjacent undulations of each pair of strips secured together, the regions spaced of the strips adjacent the side walls of the feeder being secured thereto.

11. Apparatus for conditioning heat-softenable mineral material, in combination, an elongated feeder having orifices formed in a bottom wall thereof through which the material is delivered from the feeder in a plurality of streams, current conducting means disposed in said feeder and extending generally lengthwise thereof, said current conducting means including pairs of thin metal strips extending generally lengthwise of the feeder with the respective ends of the strips secured to the end walls of the feeder, said strips being of substantial width and disposed with their widths in a direction vertically of the feeder with one pair of strips disposed above the other pair of strips, each of said strips being of undulated shape with the adjacent undulations of each pair of strips secured together, the undulations of the strips of one pair being out of registry with the undulations of the other pair whereby said strips form compartments arranged in staggered relation, the regions of the strips adjacent the side walls of the feeder being secured thereto, said strips adapted to conduct the electric energy through the material in the feeder for applying heat to the material, the lowermost of said pairs of strips being out of contact with the bottom wall of the feeder.

12. The method of processing and conditioning heat-softenable mineral material including delivering molten mineral material into a walled chamber, flowing electric current in an undulating path through the chamber for applying heat to the molten material in the chamber, compartmentalizing the interior of the chamber at the region of electric current flow through the material to restrict lateral flow of the material, establishing two different levels of the molten material in the chamber regulating the flow of electric current for varying the transfer of heat to the material of the upper level for changing the viscosity of the material of the upper level to control the rate of flow of the material to the lower level, and flowing the molten material of the lower level from the chamber in a plurality of streams.

13. The method of processing and conditioning heat-softenable mineral material including establishing a supply of heat-softenable mineral material, feeding the material into a melting zone, melting the material in said zone, flowing the molten material into a feeder, passing electric energy in an undulating path through the feeder for applying heat to the material in the feeder, compartmentalizing the interior of the feeder at the region of current flow through the material to restrict lateral flow of the material, establishing two different levels of the molten material regulating the electric current for varying the transfer of heat to the material of the upper level for changing the viscosity of the material of the upper level to control the rate of flow of the material to the lower level, and flowing the molten material of the lower level from the feeder in a plurality of streams.

References Cited in the file of this patent

UNITED STATES PATENTS

| | | |
|---|---|---|
| 416,360 | Dewey | Dec. 3, 1889 |
| 1,267,978 | Collinson | May 28, 1918 |
| 1,991,935 | Melsom | Feb. 19, 1935 |
| 2,159,361 | Atkinson et al. | May 23, 1939 |
| 2,161,916 | Erdmann | June 13, 1939 |
| 2,244,267 | Slayter et al. | June 3, 1941 |
| 2,360,373 | Tiede | Oct. 17, 1944 |
| 2,453,864 | Schler | Nov. 16, 1948 |
| 2,489,508 | Stalego | Nov. 29, 1949 |
| 2,649,487 | Phillips | Aug. 18, 1953 |
| 2,692,296 | Piolenc et al. | Oct. 19, 1954 |

FOREIGN PATENTS

| | | |
|---|---|---|
| 178,042 | Switzerland | Sept. 16, 1935 |